(12) United States Patent
Kajihara et al.

(10) Patent No.: US 8,306,287 B2
(45) Date of Patent: Nov. 6, 2012

(54) BIOMETRICS AUTHENTICATION SYSTEM

(75) Inventors: Junji Kajihara, Tokyo (JP); Isao Ichimura, Tokyo (JP); Kenji Yamamoto, Kanagawa (JP); Toshio Watanabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 610 days.

(21) Appl. No.: 12/318,387

(22) Filed: Dec. 29, 2008

(65) Prior Publication Data

US 2009/0185722 A1    Jul. 23, 2009

(30) Foreign Application Priority Data

Jan. 18, 2008   (JP) .................................. 2008-009639

(51) Int. Cl.
*G06K 9/00* (2006.01)

(52) U.S. Cl. .......... 382/124; 382/115; 713/186; 396/15; 250/556; 349/95; 340/5.53; 340/5.83

(58) Field of Classification Search ......................... None
See application file for complete search history.

(56) References Cited

U.S. PATENT DOCUMENTS

| | | | | |
|---|---|---|---|---|
| 5,745,199 | A * | 4/1998 | Suzuki et al. | 349/95 |
| 6,057,538 | A * | 5/2000 | Clarke | 250/208.1 |
| 6,373,978 | B1 * | 4/2002 | Ishihara | 382/154 |
| 7,147,153 | B2 * | 12/2006 | Rowe et al. | 235/382 |
| 7,366,331 | B2 * | 4/2008 | Higuchi | 382/124 |
| 7,550,707 | B2 * | 6/2009 | Hashimoto et al. | 250/221 |
| 2004/0252867 | A1 * | 12/2004 | Lan et al. | 382/124 |
| 2006/0115129 | A1 * | 6/2006 | Abe | 382/115 |
| 2008/0031497 | A1 * | 2/2008 | Kishigami et al. | 382/115 |

FOREIGN PATENT DOCUMENTS

| | | |
|---|---|---|
| JP | 06-140612 A | 5/1994 |
| JP | 06-151799 A | 5/1994 |
| JP | 2000-507048 | 6/2000 |
| JP | 2004-013804 A | 1/2004 |
| JP | 2005-323892 A | 11/2005 |
| JP | 2006-155575 | 6/2006 |
| JP | 3821614 | 6/2006 |
| JP | 2007-074079 | 3/2007 |
| JP | 2008-168118 A | 7/2008 |
| JP | 2008-181220 A | 8/2008 |
| JP | 2008-225671 A | 9/2008 |

OTHER PUBLICATIONS

Japanese Office Action issued Oct. 28, 2009 for corresponding Japanese Application No. 2008-009639.

* cited by examiner

*Primary Examiner* — John Lee
(74) *Attorney, Agent, or Firm* — Rader Fishman & Grauer, PLLC (57) ABSTRACT

A biometrics authentication system includes: a light source applying light to a living body; a detection section on which the living body is to be placed; a microlens array section configured so that a plurality of microlenses each condensing light from the living body are arranged at intervals; a light shielding section arranged on at least one of a light incidence side and a light exiting side of the microlens array section and having apertures each facing a region where each of the microlenses is arranged; an image pickup device obtaining image pickup data of the living body on the basis of the light condensed by the microlens array section; and an authentication section performing authentication of the living body on the basis of the image pickup data obtained in the image pickup device.

5 Claims, 13 Drawing Sheets

BIOMETRICS AUTHENTICATION SYSTEM

CROSS REFERENCES TO RELATED APPLICATIONS

The present invention contains subject matter related to Japanese Patent Application JP 2008-009639 filed in the Japanese Patent Office on Jan. 18, 2008, the entire contents of which being incorporated herein by reference.

BACKGROUND OF THE INVENTION

1. Field of the Invention

The present invention relates to a biometrics authentication system performing authentication of a living body on the basis of data obtained by picking up an image of a structure in a living body part such as veins or a fingerprint.

2. Description of the Related Art

In related arts, image pickup apparatuses picking up an image of a structure in a living body part are used in biometrics authentication systems or the like, and various biometrics authentication systems performing authentication of a living body, for example, through the use of image pickup data of fingerprints or veins have been proposed. Typically, in such a biometrics authentication system, an image pickup apparatus has a large thickness, so in the case where the image pickup apparatus is applied to a low-profile device, a technique of arranging the image pickup apparatus outside an authentication system and a technique of independently arranging an optical system (an image pickup lens) and a detection system (an image pickup device) have been mainstream.

However, in recent years, according to a reduction in profiles of various devices, constraints of manufacturability or design, or the like, the implementation of a biometrics authentication system as a low-profile module capable of being directly mounted on such a device is desired. Therefore, in Japanese Unexamined Patent Application Publication No. 2006-155575, an image pickup optical system in which a near-infrared light source is arranged obliquely below a finger, thereby light is applied to the inside of the finger to obtain image pickup data of veins has been proposed. Moreover, in Japanese Unexamined Patent Application Publication No. 2007-74079 and Japanese Patent No. 3821614, image pickup apparatuses picking up an image by an image pickup device receiving light condensed by a microlens array have been proposed.

SUMMARY OF THE INVENTION

In an image pickup optical system using the above-described microlens array, an image condensed by each microlens of an object subjected to image pickup is formed on an image pickup device. At this time, there is an issue that an unnecessary light beam enters (crosstalks) from an adjacent microlens to reduce the image quality of a picked-up image. Therefore, in Japanese Unexamined patent Application Publication No. 2007-74079 and Japanese Patent No. 3821614, a light shielding wall is arranged between microlenses which are arranged in a lattice form in a microlens array to prevent the occurrence of the above-described crosstalk.

However, to avoid an unnecessary light beam by arranging a light shielding wall between microlenses, it is necessary for the light shielding wall to be formed with a sufficient height, so there is an issue that the thickness of the whole system is increased by the height of the light shielding wall.

In view of the foregoing, it is desirable to provide a biometrics authentication system capable of reducing its profile while performing authentication of a living body on the basis of a picked-up image less affected by crosstalk.

According to an embodiment of the invention, there is provided a biometrics authentication system including: a light source applying light to a living body; a detection section on which the living body is to be placed; a microlens array section configured so that a plurality of microlenses each condensing light from the living body are arranged at intervals; a light shielding section arranged on at least one of a light incidence side and a light exiting side of the microlens array section and having apertures each facing a region where each of the microlenses is arranged; an image pickup device obtaining image pickup data of the living body on the basis of the light condensed by the microlens array section; and an authentication section performing authentication of the living body on the basis of the image pickup data obtained in the image pickup device.

In the biometrics authentication system according to the embodiment of the invention, when the living body is placed on the detection section, light is applied from the light source to the living body, and after the light is condensed by each microlens, the condensed light is received by the image pickup device. Then, image pickup data of the living body is obtained in the image pickup device, and the authentication of the living body is performed on the basis of the image pickup data. In this case, in the microlens array, a plurality of microlenses are arranged at intervals, and the light shielding section having apertures in regions facing the microlenses is arranged on at least one of the light incidence side and the light exiting side, thereby in the image pickup device, an unnecessary light beam is prevented from easily entering from neighboring microlenses.

In the biometrics authentication system according to the embodiment of the invention, a plurality of microlenses are arranged at intervals in the microlens array, and the light shielding section having apertures in regions facing the microlens is arranged on at least one of the light incidence side and the light exiting side, so without arranging a light shielding wall with a height in the thickness direction of the system, an unnecessary light beam from neighboring microlenses is able to be prevented from being easily received by the image pickup device. Therefore, the biometrics authentication system capable of achieving a reduction in its profile while performing authentication of the living body on the basis of a picked-up image less affected by crosstalk is able to be achieved.

Other and further objects, features and advantages of the invention will appear more fully from the following description.

DETAILED DESCRIPTION OF THE PREFERRED EMBODIMENTS

A preferred embodiment will be described in detail below referring to the accompanying drawings.

Figure 1:
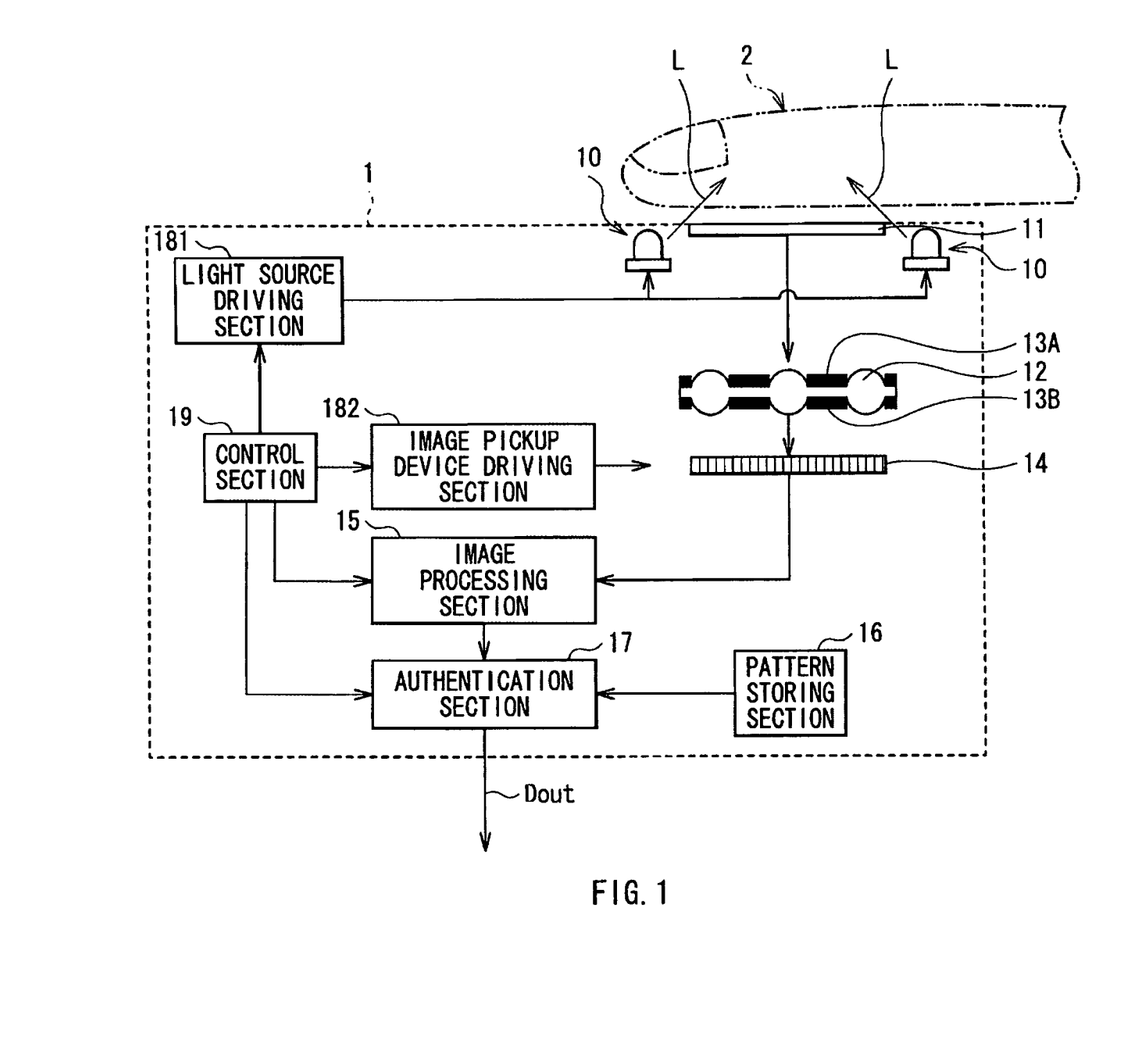
FIG. 1 is a functional block diagram illustrating the whole configuration of a biometrics authentication system according to an embodiment of the invention.
Figure 2:
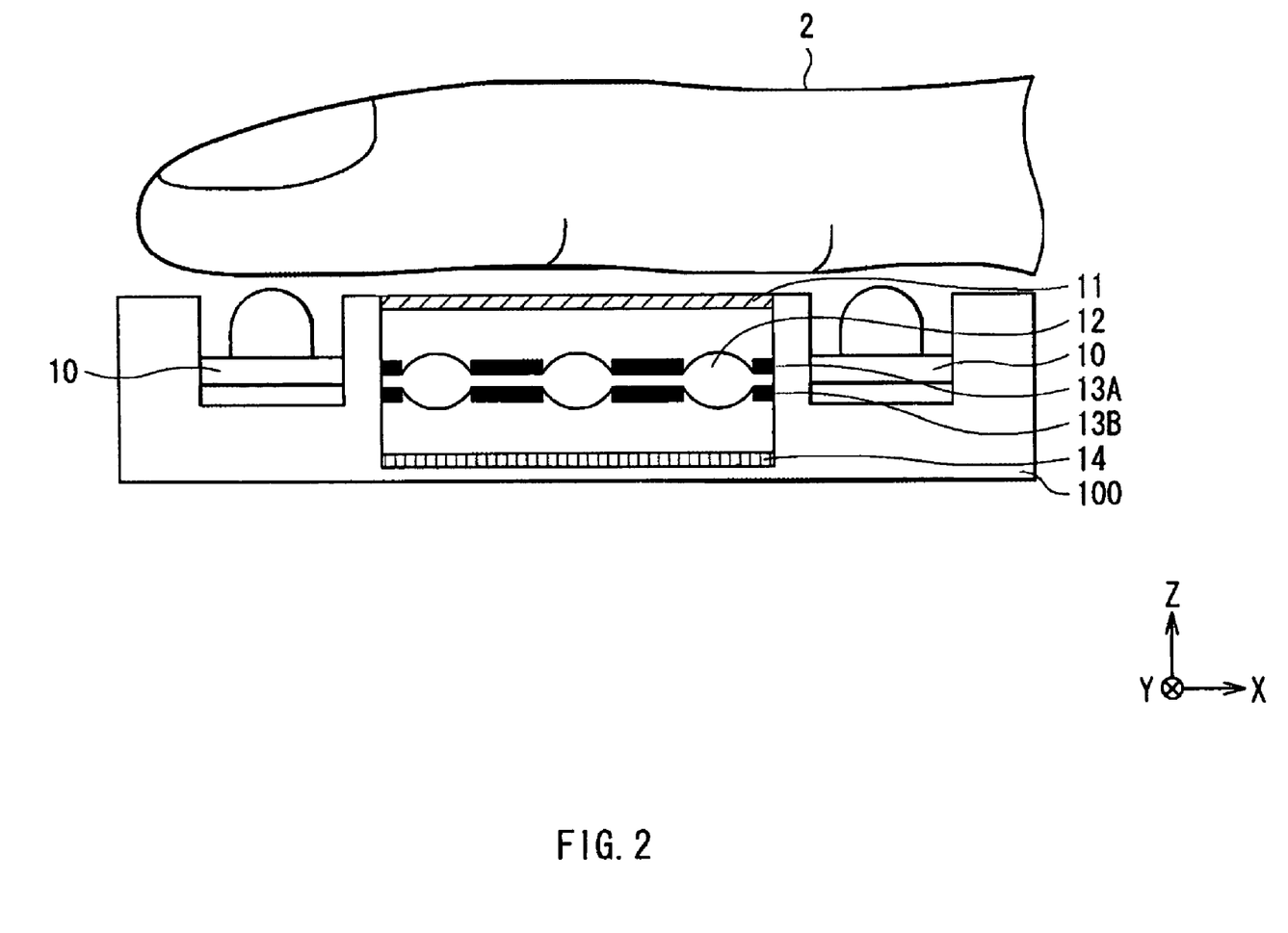
FIG. 2 is a schematic sectional view illustrating the biometrics authentication system illustrated in FIG. 1.

FIG. 1 illustrates the whole configuration of a biometrics authentication system 1 according to an embodiment of the invention. FIG. 2 illustrates a z-x sectional view of the biometrics authentication system 1. The biometrics authentication system 1 specifically picks up an image of a structure of a living body (for example, a fingertip) 2, for example, veins to perform authentication, and includes light sources 10, a detection section 11, an aperture ratio distribution filter 11, a microlens array 12, light shielding sections 13A and 13B, an image pickup device 14, an image processing section 15, a pattern storing section 16, an authentication section 17, a light source driving section 181, an image pickup device driving section 182 and a control section 19.

The light sources 10 apply light to the living body 2 as an object subjected to image pickup, and are made of, for example, an LED (Light Emitting Diode) or the like. The light sources 10 are arranged on the same side as a side where the image pickup device 14 is arranged relative to the living body 2, for example, in both end positions in the longitudinal direction (an x direction) of the living body 2. In the case where an image of a structure inside the living body 2, for example, an image of veins is picked up, the light sources 10 emit light of a near-infrared wavelength region (a wavelength region approximately from 700 nm to 1200 nm).

The detection section 11 is made of, for example, a cover glass or the like, and is a region (plane) where the living body 2 is detected, that is, a region (plane) where the living body 2 is placed. However, the living body 2 does not necessarily make direct contact with the detection section 11, and the living body 2 may be placed above the detection section 11.

The microlens array 12 is arranged, for example, below the detection section 11 so that an image of a desired observation plane inside the living body 2 is formed on a light-receiving plane on the image pickup device 14, and condenses light applied to the living body 2. In the microlens array 12, a plurality of microlenses are arranged at intervals on, for example, a transparent substrate. The thickness or the diameter of each microlens or an interval between microlenses are appropriately set by desired image magnification or desired resolution. Moreover, as the microlenses, for example, liquid crystal lenses, liquid lenses, diffractive lenses and the like may be used.

The light shielding sections 13A and 13B are arranged on a light incidence side and a light exiting side of the microlens array 12, respectively. The light shielding sections 13A and 13B block a light beam entering into the microlens array 12 or a light beam emitted from the microlens array 12 in a selective region to limit a light beam entering into the image pickup device 14. The configurations of the light shielding sections 13A and 13B will be described in detail later.

The image pickup device 14 receives light from the microlens array 12 to obtain image pickup data, and is arranged on a focal plane of the microlens array 12. The image pickup device 14 includes a plurality of CCDs (Charge Coupled Devices), CMOSs (Complementary Metal Oxide Semiconductors) or the like arranged in a matrix form.

The image processing section 15 performs predetermined image processing on the image pickup data obtained in the image pickup device 14 in response to the control of the control section 19 to output the image pickup data to the authentication section 17. In addition, the image processing section 15, and the authentication section 17 and the control section 19 which will be described later each include, for example, a microcomputer or the like.

The pattern storing section 16 is a section storing a biometrics authentication pattern (which is a comparison pattern relative to an image pickup pattern obtained at the time of authentication, and which is obtained by picking up an image of a living body in advance), and includes a nonvolatile memory device (for example, an EEPROM (Electrically Erasable Programmable Read Only Memory) or the like).

The authentication section 17 is a section performing authentication of the living body 2 by comparing an image pickup pattern outputted from the image processing section 15 to the biometrics authentication pattern stored in the pattern storing section 16 in response to the control of the control section 19.

The light source driving section 181 drives the light sources 10 to emit light in response to the control of the control section 19. The image pickup device driving section 182 drives the image pickup device 13 to pick up an image (to receive light) in response to the control of the control section 19. The control section 19 controls the operations of the image processing section 15, the authentication section 17, the light source driving section 181 and the image pickup device driving section 182.

Figure 3A:
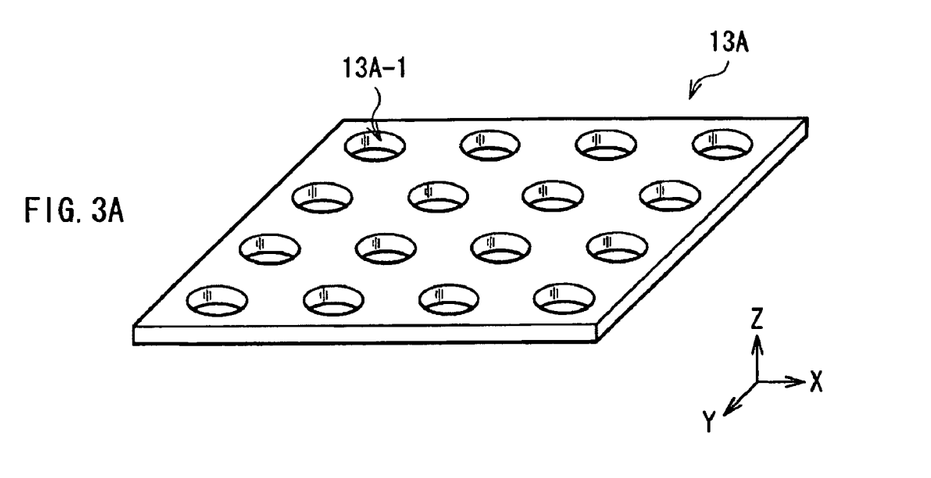
FIGS. 3A and 3B are schematic perspective views illustrating a light shielding section illustrated in FIG. 1.
Figure 3B:
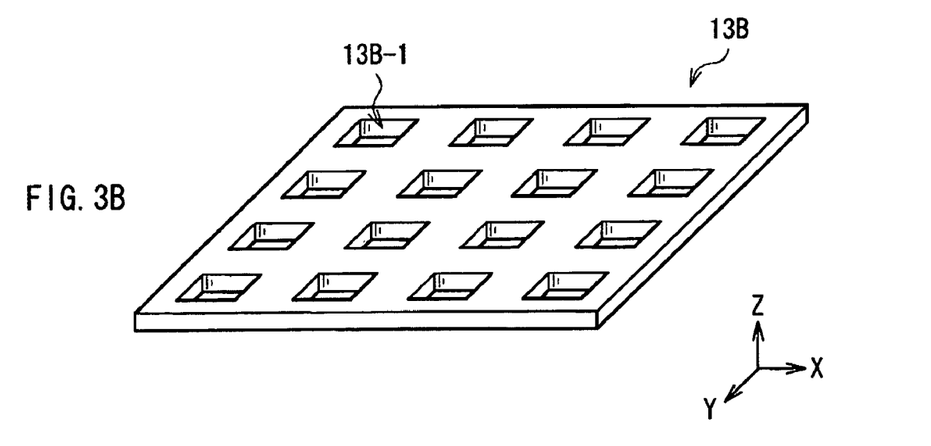

Next, the configurations of the light shielding sections 13A and 13B will be described in detail referring to FIGS. 3A and 3B. FIGS. 3A and 3B are perspective views illustrating examples of a light shielding section.

The light shielding sections 13A and 13B each include apertures in regions facing the microlenses arranged in the microlens array 12. For example, in the light shielding section 13A, circular-shaped apertures 13A-1 illustrated in FIG. 3A are arranged, and in the light shielding section 13B, rectangular-shaped apertures 13B-1 illustrated in FIG. 3B are arranged. The microlens array 12 is sandwiched between the light shielding section 13A and the light shielding section 13B so that convex parts of the microlenses are projected from the apertures.

Such light shielding sections 13A and 13B are able to be formed by pattern-forming a plurality of apertures corresponding to the positions of the above-described microlenses on, for example, a metal film made of stainless, copper (Cu), nickel (Ni) or the like by etching through the use of, for example, a photolithography method.

Next, functions and effects of such a biometrics authentication system 1 will be described below.

In the biometrics authentication system 1, at first, when the living body (for example, a fingertip) 2 is placed on the detection section 11, and the light sources 10 are driven by the light source driving section 181, light L emitted from the light sources 10 is applied to the living body 2. The light applied to the living body 2 is scattered, for example, in the living body 2, and is absorbed into veins. On the other hand, each microlens in the microlens array 12 is arranged so that an image of a desired observation plane inside the living body 2 is formed on a light-receiving plane on the image pickup device 14, thereby after light inside the living body 2 is condensed by the microlens array 12, the light enters into the image pickup device 14. Thus, in the image pickup device 14, vein image pickup data (a vein pattern) of the living body 2 is obtained. Then, after the image processing section 15 performs appropriate image processing on the vein pattern obtained by the image pickup device 14, the vein pattern is inputted into the authentication section 17. In the authentication section 17, the inputted vein pattern is compared to an authentication pattern for vein authentication stored in the pattern storing section 16, thereby authentication is performed. Accordingly, a final biometrics authentication result (authentication result data Dout) is outputted, thereby biometrics authentication is completed.

Figure 4:
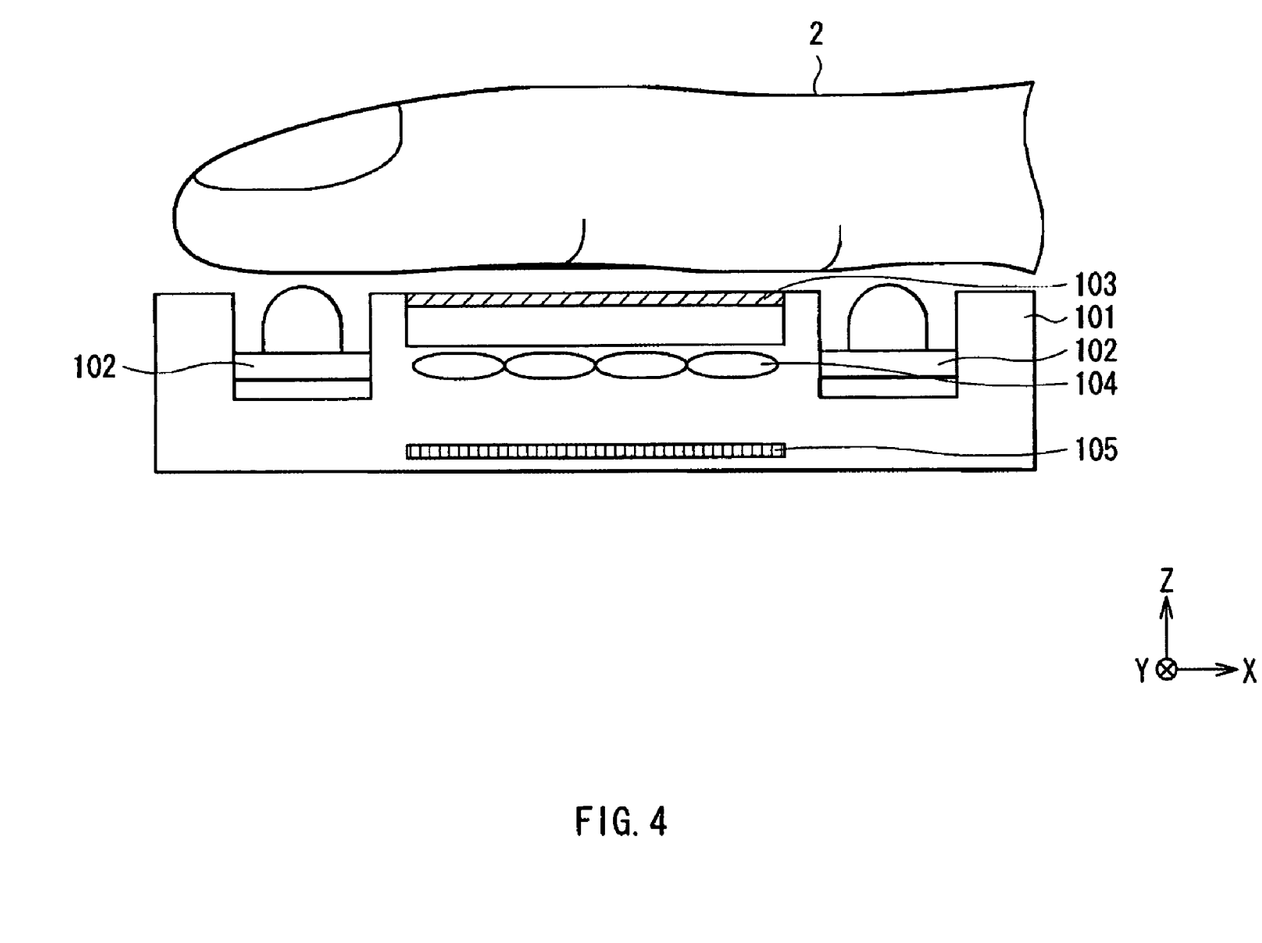
FIG. 4 is a schematic sectional view illustrating a biometrics authentication system according to a related art example.
Figure 5:
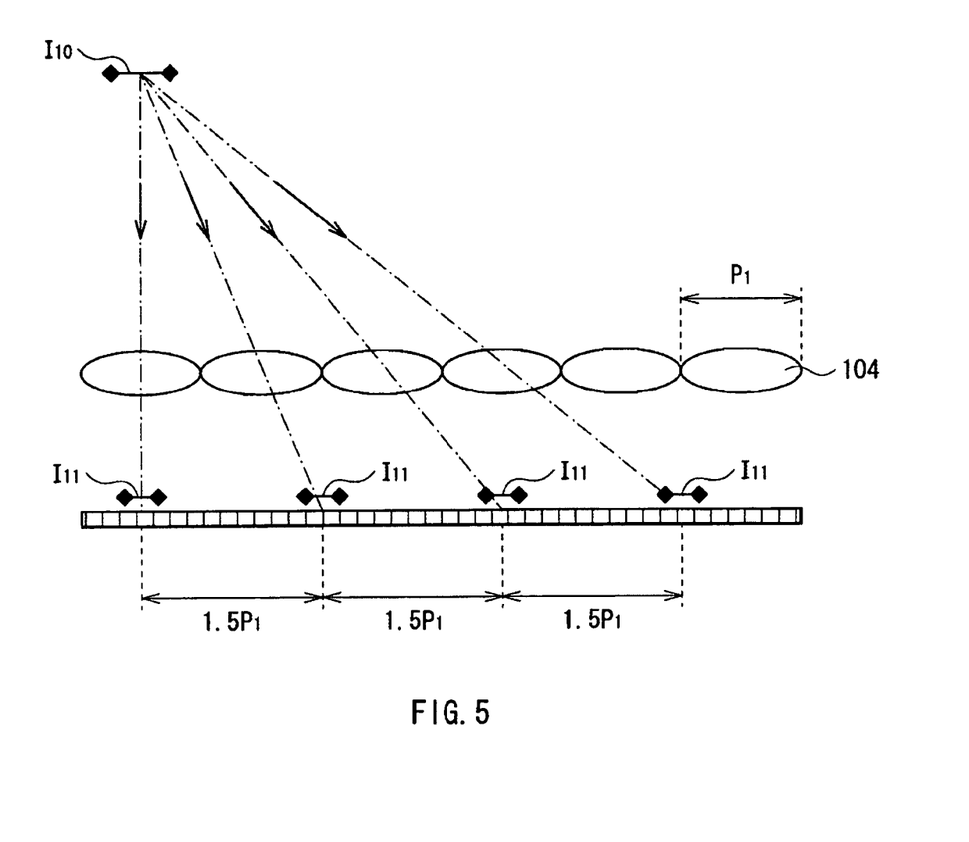
FIG. 5 is a schematic view for describing a function of the biometrics authentication system illustrated in FIG. 4.
Figure 6:
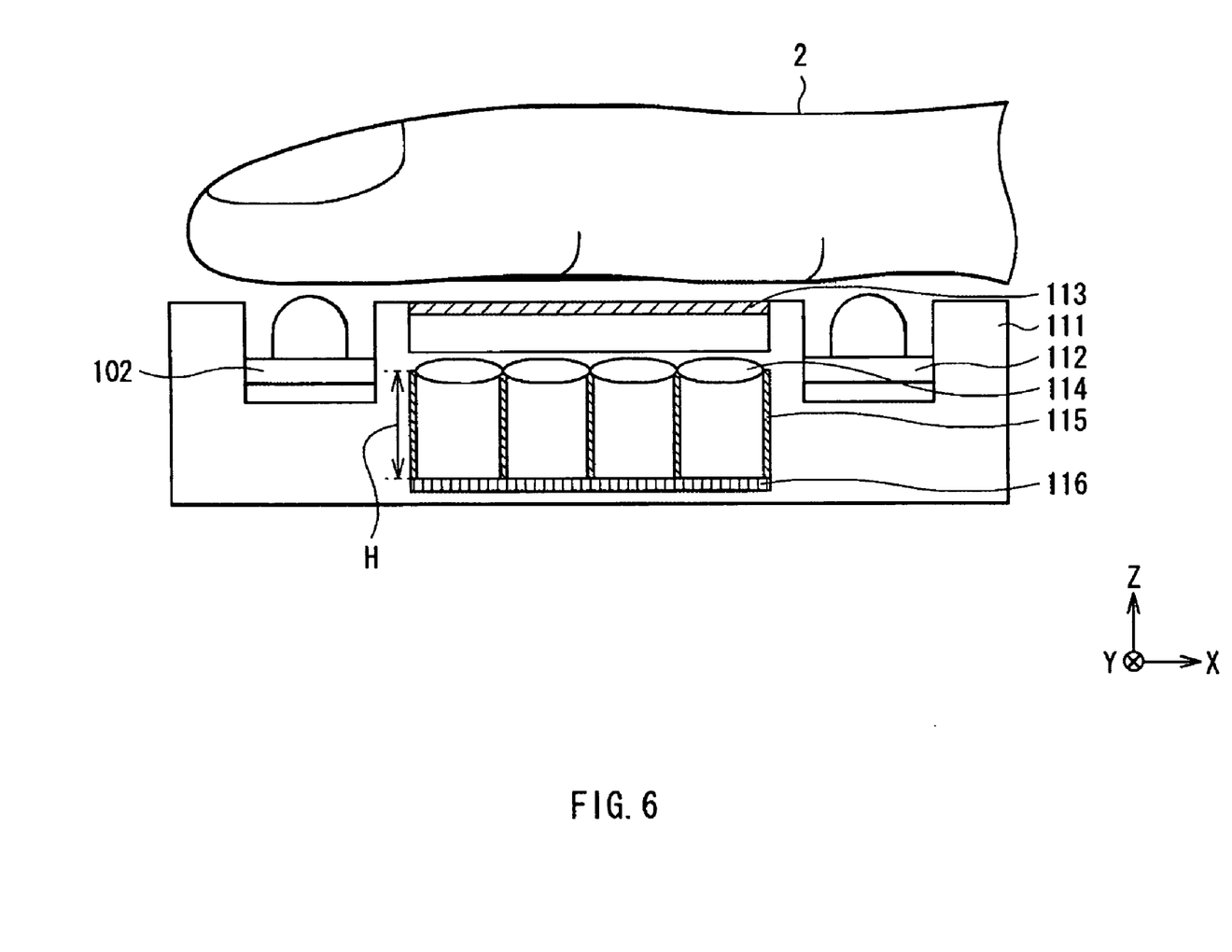
FIG. 6 is a schematic sectional view illustrating a biometrics authentication system according to a comparative example.
Figure 7:
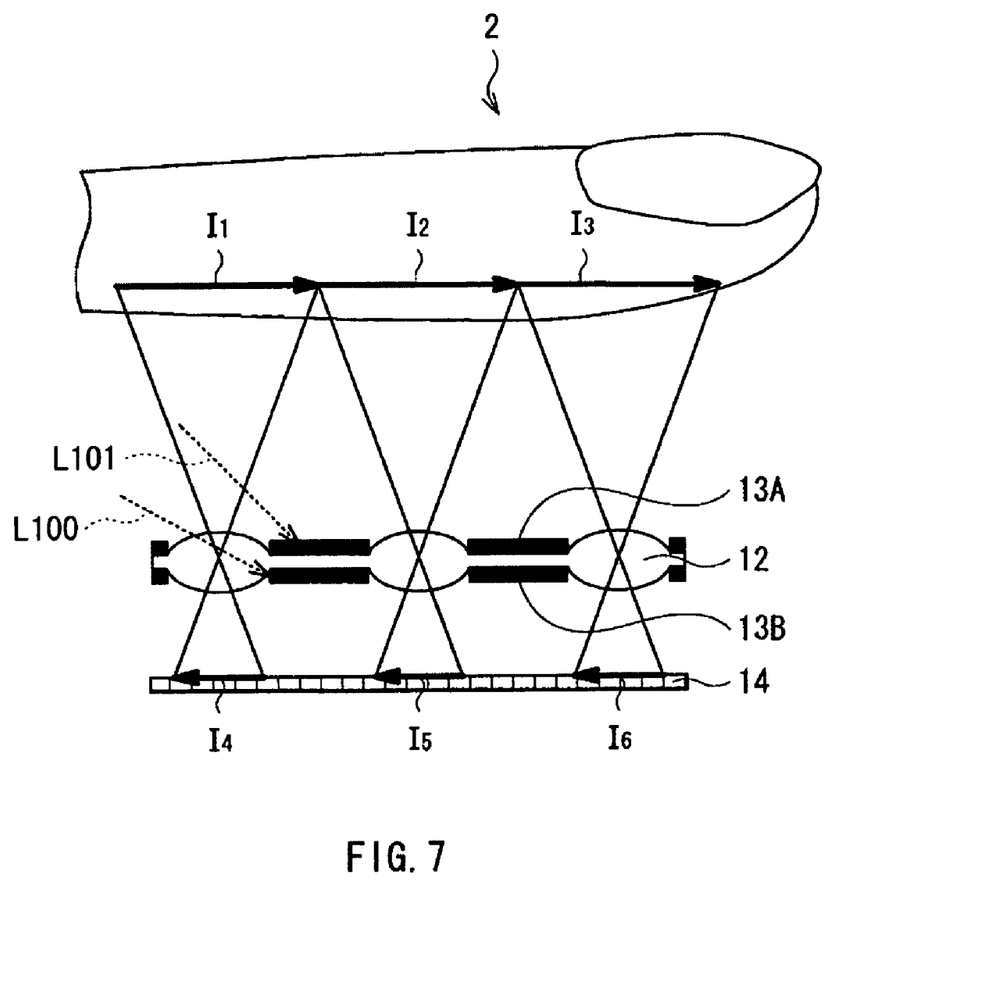
FIG. 7 is a schematic view for describing a function of the biometrics authentication system illustrated in FIG. 1.
Figure 8A:
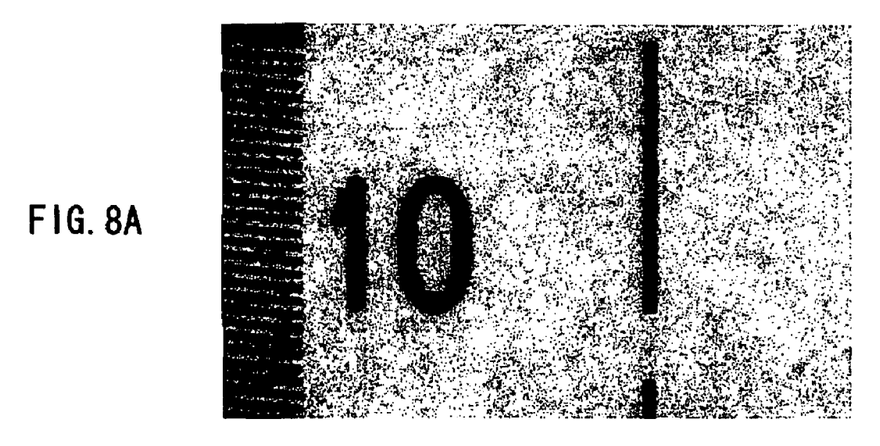
FIGS. 8A and 8B are examples of actual picked-up images.
Figure 8B:
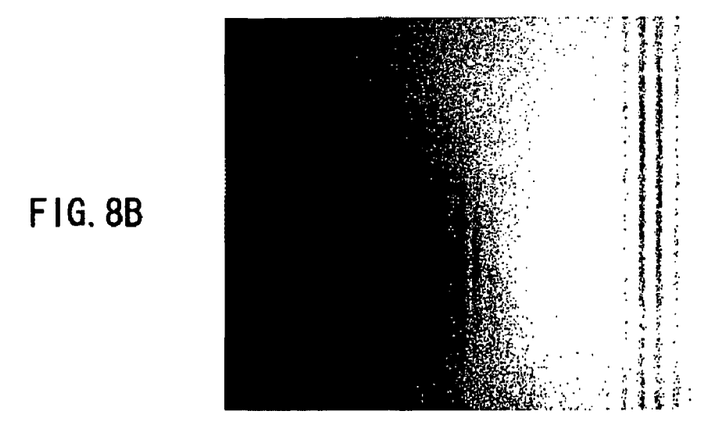

Now, functions of the light shielding sections 13A and 13B will be described referring to FIGS. 7 and 8A in comparison with a related art example illustrated in FIGS. 4, 5 and 8B and a comparative example illustrated in FIG. 6. FIG. 4 is a Z-X sectional view illustrating a schematic configuration of a biometrics authentication system in a related art. FIG. 5 is a schematic view for describing functions of the biometrics authentication system illustrated in FIG. 4. FIG. 6 is a Z-X sectional view illustrating a schematic configuration of a biometrics authentication system according to the comparative example. FIG. 7 is a schematic view for describing functions of the biometrics authentication system according to the embodiment. FIGS. 8A and 8B are examples of actual picked-up images, and FIG. 8A relates to the embodiment of the invention, and FIG. 8B relates to the related art example.

As illustrated in FIG. 4, in the biometrics authentication system in the related art, a microlens array 104 including a plurality of microlenses and an image pickup device 105 are arranged below a detection section 103. In the microlens array 104, the microlenses are tightly arranged in a matrix form. Thereby, light condensed by the microlens array 104 forms an image on the image pickup device 105 to obtain image pickup data.

However, in such a configuration, as illustrated in FIG. 5, a light beam from an image $I_{10}$ of the living body 2 enters into a plurality of microlenses to form a plurality of images $I_{11}$ on the image pickup device 105. For example, in the case where the diameter (pitch) of the microlens is $P_1$, and image magnification is 2:1, a plurality of images $I_{11}$ having a size equal to ½ of the size of the image $I_{10}$ are formed on the image pickup device 105 at intervals equal to 1.5 times larger than the diameter of the microlens. As a result, crosstalk occurs between microlenses to cause a decline in image quality as illustrated in, for example, FIG. 8B.

Therefore, in the biometrics authentication system illustrated in FIG. 6, light shielding walls 115 are arranged in regions between microlenses on a light exiting side of a microlens array 114 (on a side closer to an image pickup device). The light shielding walls 115 are formed in a lattice form corresponding to the positions of the microlenses on an X-Y plane, and are formed to have a length (height) H in a Z direction. Thereby, on the image pickup device, the occurrence of the above-described crosstalk is prevented.

However, in such a configuration in which the light shielding walls 115 are arranged in regions between the microlenses, the entry of a light beam into an adjacent microlens is prevented by the length H in the Z direction of the light shielding wall 115, so as a result, the thickness of the whole system is increased, and an increase in the thickness of the whole system is disadvantageous for a reduction in the profile of the system.

On the other hand, in the embodiment, in the microlens array 12, a plurality of microlenses are arranged at intervals, and the light shielding sections 13A and 13B having apertures in regions facing the microlenses are arranged on the light incidence side and the light exiting side of the microlens array 12. Thereby, as illustrated in FIG. 7, intervals between adjacent microlenses are optimized, and an unnecessary light beam L100 condensed by neighboring microlenses is prevented from easily entering into a light reception region corresponding to each microlens on the image pickup device 14. Moreover, scattered light 101 such as outside light or stray light which is not condensed by each microlens is prevented from being easily received on the image pickup device 14. Thereby, images $I_1$, $I_2$ and $I_3$ of the living body 2 are condensed by microlenses corresponding to the images $I_1$, $I_2$ and $I_3$, respectively, to be formed on the image pickup device 14 as light reception images $I_4$, $I_5$ and $I_6$. As a result, for example, as illustrated in FIG. 8A, the influence of crosstalk is prevented, thereby a picked-up image with high image quality is able to be obtained.

As described above, in the biometrics authentication system 1 according to the embodiment, a plurality of microlenses are arranged at intervals in the microlens array 12, and the light shielding sections 13A and 13B having apertures in regions facing the microlenses are arranged on the light incidence side and the light exiting side of the microlens array 12, so without arranging the light shielding wall having a height in the thickness direction of the system, an unnecessary light beam from neighboring microlenses is able to be prevented from being easily received on the image pickup device 14. Therefore, the biometrics authentication system capable of achieving a reduction in its profile while performing authentication of the living body on the basis of a picked-up image less affected by crosstalk is able to be achieved. Moreover, the living body authentication precision is improved by performing authentication of the living body on the basis of an image which is less affected by crosstalk and has high image quality.

Moreover, in the microlens array 12, when intervals between the microlenses are expanded, wide light shielding areas in the light shielding sections 13A and 13B are able to be secured, so the occurrence of crosstalk is able to be prevented more effectively. At this time, when intervals between the microlenses are expanded to increase a light shielding ratio, the absolute number of microlenses is reduced, thereby the resolution of a picked-up image declines. Even if the resolution of the picked-up image declines to some extent in such a manner, sufficient authentication precision is maintained in biometrics authentication, so there is not any practical issue. Moreover, the resolution is able to be maintained to some extent by increasing the image magnification of each microlens.

Further, in the biometrics authentication system using the light shielding walls according to the above-described comparative example, it is necessary to form high light shielding walls between microlenses arranged in a lattice form, so manufacturing processes are complicated, but on the other hand, the light shielding sections 13A and 13B according to the embodiment are able to be formed by etching an aperture pattern on a metal plate, so the light shielding sections 13A and 13B are able to be manufactured by simple manufacturing processes.

Figure 9:
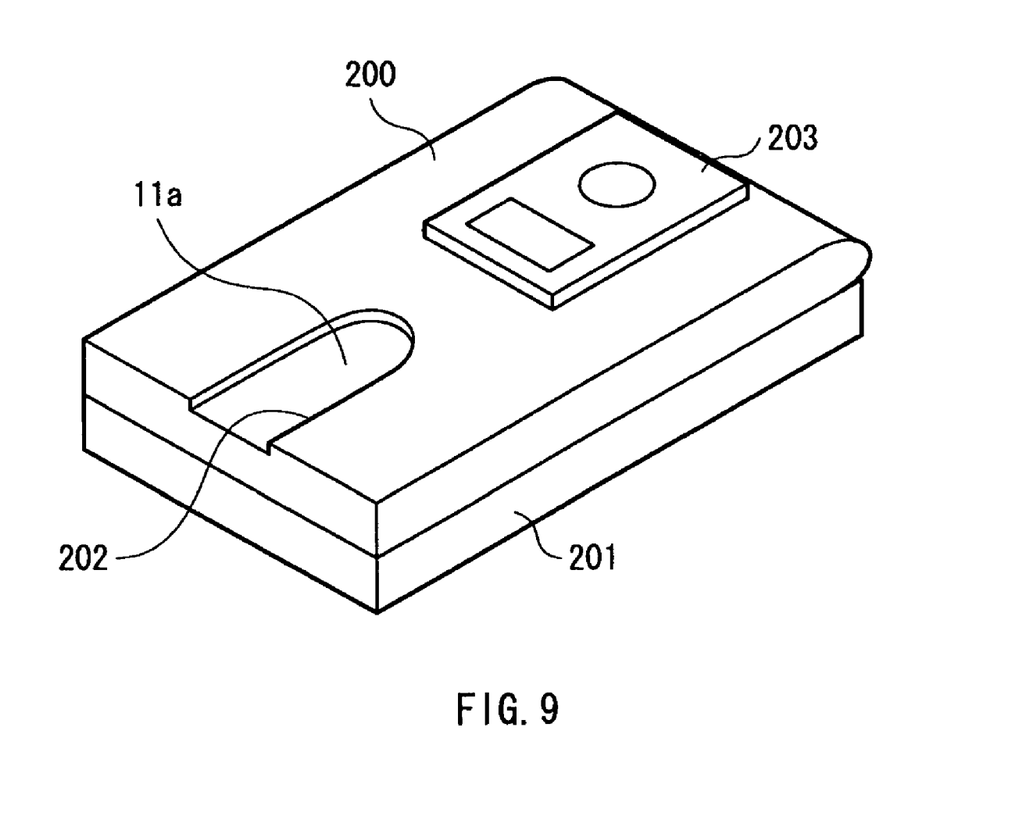
FIG. 9 is an illustration of an application example of the biometrics authentication system illustrated in FIG. 1.

The biometrics authentication system 1 is suitably applicable to low-profile portable modules such as cellular phones, low-profile laptop computers, portable memories and various cards. FIG. 9 is a schematic view of an example of a cellular phone using the biometrics authentication system 1. The cellular phone includes a finger guide 202 on which the living body 2 (a fingertip) is to be placed and a display section 203 displaying an authentication result on a surface of a flip-type enclosure (a first enclosure 200 and a second enclosure 201). The biometrics authentication system 1 is included in the first enclosure 200, and a bottom section of the finger guide 202 corresponds to the detection section 11, and the light shielding section 13A, the microlens array 12, the light shielding section 13B and the image pickup device 14 are arranged in order below the detection section 11.

Next, a modification of the invention will be described below.

Modification

Figure 10:
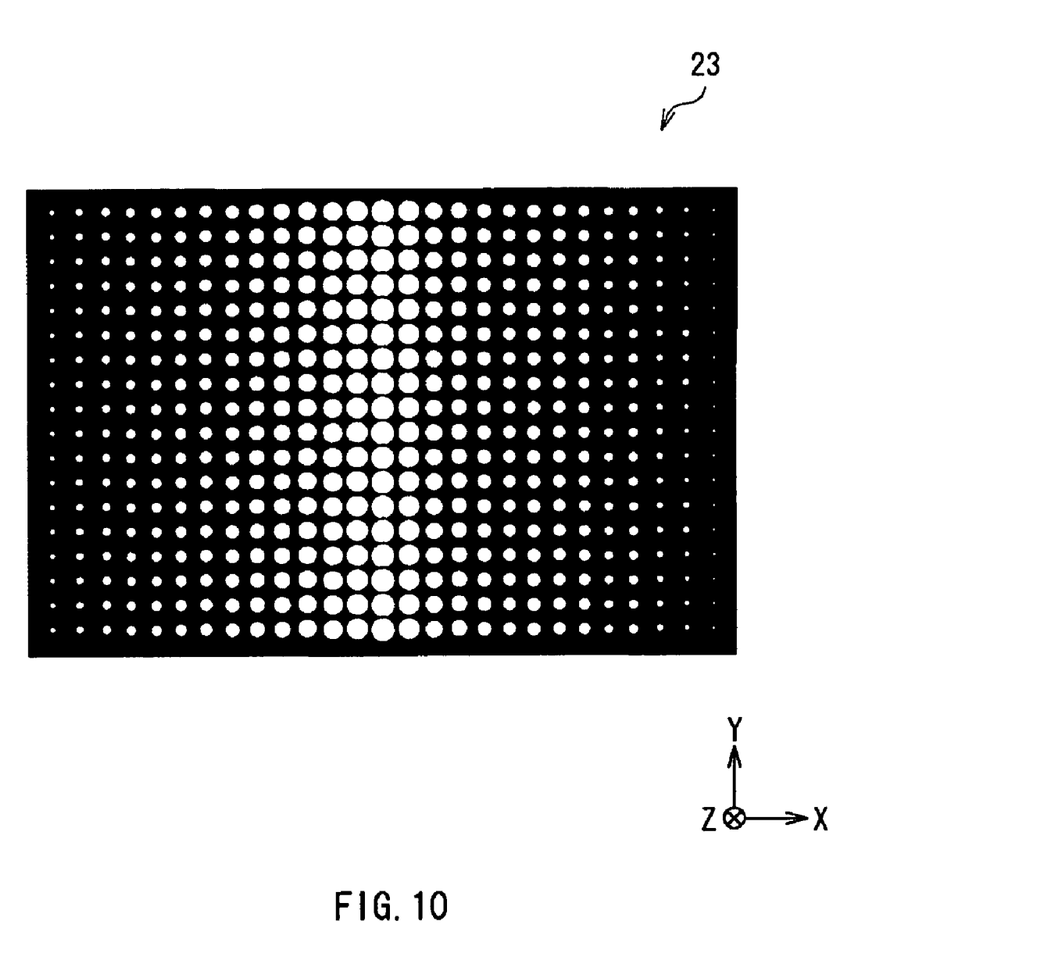
FIG. 10 is a schematic plan view illustrating a light shielding section according to a modification of the invention.

FIG. 10 is a plan view illustrating a schematic configuration of a light shielding section 23 according to a modification of the invention. The light shielding section 23 is arranged on a light incidence side or a light exiting side of the microlens array 1 as in the case of the above-described light shielding sections 13A and 13B, and an aperture is arranged in a region facing each of the microlenses. However, the light shielding section 23 has an aperture ratio distribution in which the aperture ratio is higher in s region far from the light sources 10 than in a region near the light sources 10. For example, as illustrated in FIG. 10, the light shielding section 13 has a configuration in which a central part has the largest aperture area, and the aperture area is gradually reduced from the central part to an edge part. Also in such a configuration, one aperture is arranged for and faces one microlens, and irrespective of the aperture area, the plane area of each microlens is uniform.

Figure 11A:
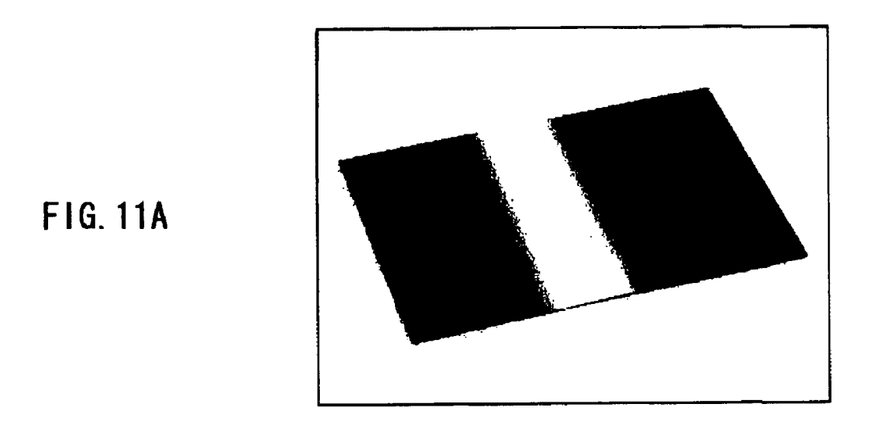
FIGS. 11A and 11B are illustrations for describing the configuration of a transmittance distribution filter.
Figure 11B:
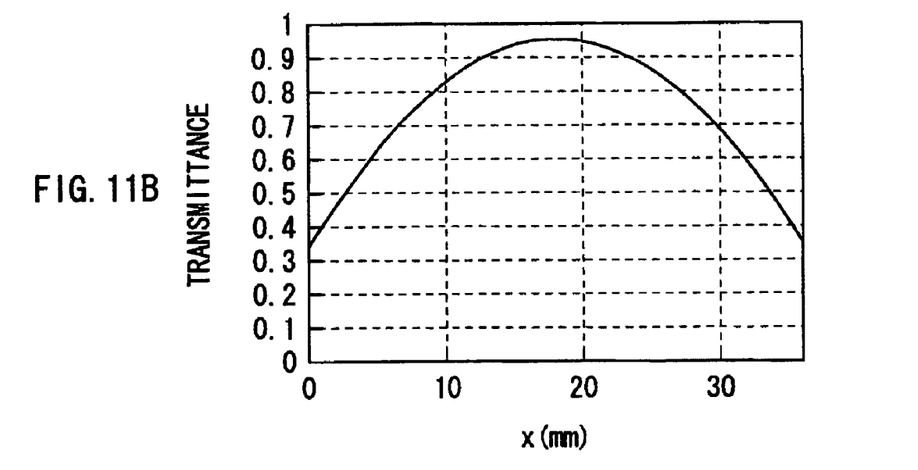

In other words, the light shielding section 23 has the function of a light shielding section having a plurality of apertures illustrated in FIGS. 3A and 3B and the function of a transmittance distribution filter. FIGS. 11A and 11B illustrate an example of the transmittance distribution filter. FIG. 11A illustrates an outline view of the transmittance distribution filter, and FIG. 11B is a plot illustrating the distribution of the transmittance of the transmittance distribution filter. As illustrated in the drawings, the transmittance in the transmittance distribution filter draws, for example, a two-dimensional distribution in which the transmittance is the highest in a central part, and is gradually reduced from the central part to an edge part. In FIG. 11A, whiter color means higher the transmittance, and blacker color means lower transmittance.

Figure 12A:
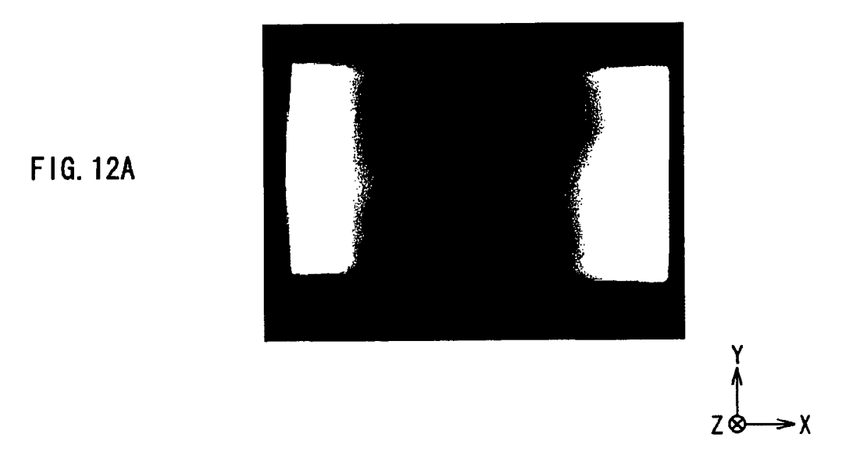
FIGS. 12A and 12B are illustrations relating to a picked-up image obtained by a biometrics authentication system according to a comparative example.
Figure 12B:
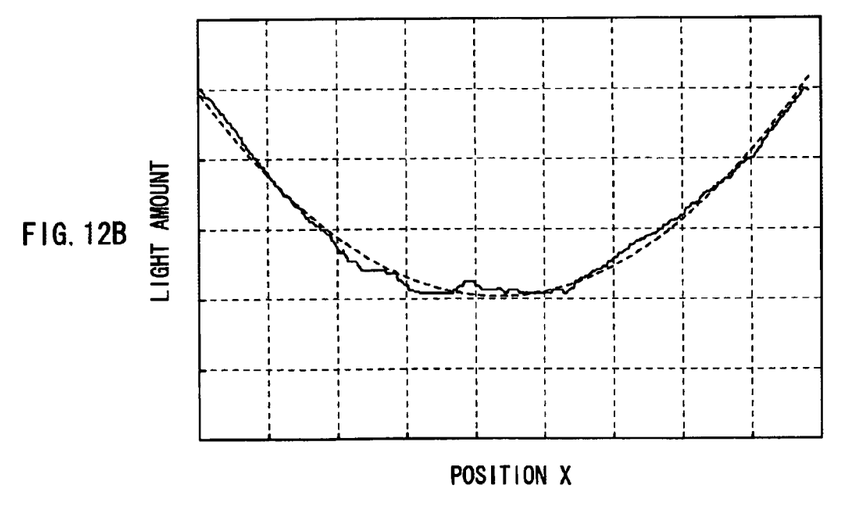

In general, in the biometrics authentication system, as described above, in the case where light is applied from the light source arranged below the living body (on an image pickup device side) to reduce the profile, the light amount is large in a region near the light source, and small in a region far from the light source because of the influence of the transmittance of the living body. Therefore, as illustrated in FIGS. 12A and 12B, the light amount distribution in a picked-up image becomes uneven. FIG. 12A illustrates an actual image picked up without using the transmittance distribution filter, and the FIG. 12B illustrates the light amount distribution in the picked-up image.

Figure 13:
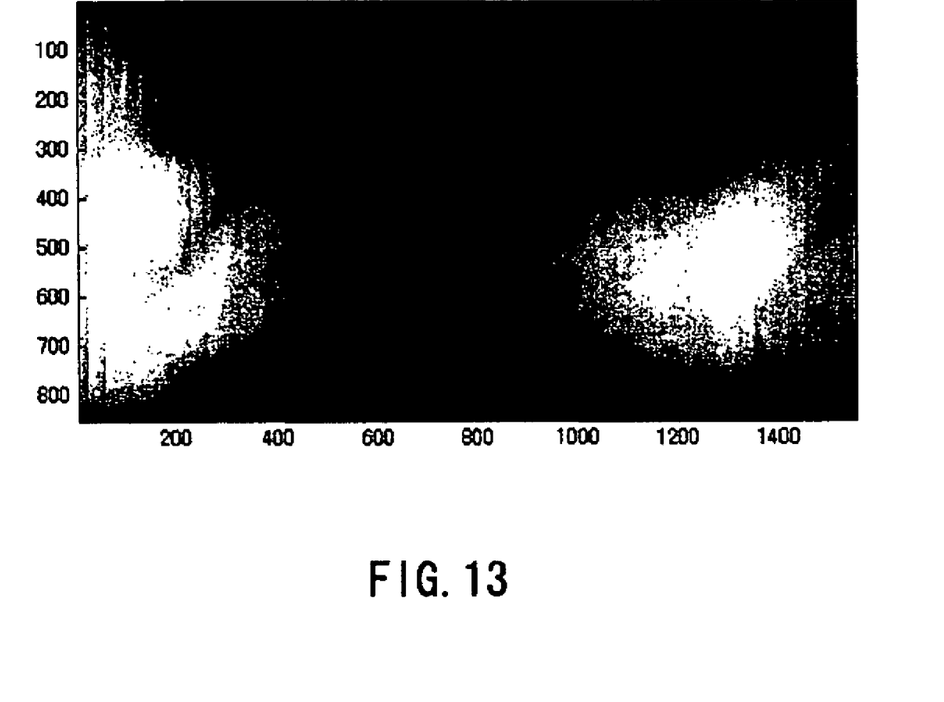
FIG. 13 is a picked-up image obtained through the use of the light shielding section illustrated in FIG. 10.

Therefore, when a light shielding section has an aperture ratio distribution in which the aperture ratio is higher in a region far from the light source than in a region near the light source, and has the function of the above-described light shielding section and the function of the transmittance distribution filter like the light shielding section 23, only one light shielding section is able to prevent the occurrence of crosstalk, and is able to reduce unevenness in the light amount due to the arrangement of the light source. Therefore, for example, as illustrated in FIG. 13, a picked-up image with high image quality and reduced unevenness in light amount is able to be obtained.

Although the present invention is described referring to the embodiment, the invention is not limited to the embodiment, and may be variously modified. For example, in the above-described embodiment, the invention is described referring to the configuration in which the light shielding sections are arranged on both of the light incidence side and the light exiting side of the microlens array as an example; however, the invention is not limited to the configuration, and the light shielding section may be arranged only on the light incidence side or only on the light exiting side. However, preferably, the light shielding section is arranged on the light exiting side, and more preferably the light shielding sections are arranged on both of the light incidence side and the light exiting side. It is because an unnecessary light beam from neighboring microlenses is easily blocked.

Moreover, in the above-described embodiment, as the light shielding section, a light shielding section having circular-shaped apertures or rectangular-shaped apertures is described as an example; however, the shapes of the apertures in the light shielding section are not limited to the above-described shapes, and the apertures may have any other shape. Further, in the case where the light shielding sections are arranged on both of the light incidence side and the light exiting side of the microlens array, the shapes of the apertures on the light incidence side and the light exiting side may be the same as or different from each other.

In the above-described embodiment, the configuration in which the light shielding sections are formed by etching an aperture pattern corresponding to the positions of microlenses on a metal film through the use of a photolithography method, and the microlens array is sandwiched between the light shielding sections is described as an example; however, the invention is not limited to the configuration, and the light shielding sections may be directly formed by evaporating chromium (Cr) or the like onto, for example, a region where the microlenses of the microlens array are not formed.

In the above-described embodiment, the configuration in which the light sources are arranged on both side positions in the longitudinal direction of the living body 2 is described as an example; however, the position of the light source is not limited to the configuration, and as long as the light source is arranged, with respect to the detection section, on the same side as a side where the image pickup device is arranged, the light source may be arranged only on one side.

In addition to components described in the above-described embodiment, a transmittance distribution filter for reducing unevenness in light amount, or a near-infrared pass filter, for example, in the case where a vein pattern is obtained may be further arranged. The near-infrared pass filter is a filter selectively passing light of a near-infrared wavelength region therethrough, and is made of, for example, a material formed by adding a copper phthalocyanine-based compound, a metal-free phthalocyanine-based compound, an anthraquinone-based dye or the like to an acrylic resin. When such a near-infrared pass filter is arranged, outside light or the like is avoided, and a picked-up image with higher image quality is easily obtained.

In the above-described embodiment, the case where appropriate image processing is performed on image pickup data obtained in the image pickup device 13 in the image processing section 15, and then authentication is performed is described; however, for example, in some cases, the image processing section 15 may not be arranged, and the authentication section 17 may directly perform authentication on the basis of the image pickup data from the image pickup device 13. In such a configuration, the system configuration may be further simplified, and the profile of the whole system may be further reduced.

In the above-described embodiment, the case where biometrics authentication is performed on the basis of a structure inside the living body 2, for example, a vein pattern is described; however, the invention is not limited to the case, and, for example, a fingerprint pattern may be obtained, and on the basis of the result, a final authentication result may be outputted.

It should be understood by those skilled in the art that various modifications, combinations, sub-combinations and alterations may occur depending on design requirements and other factors insofar as they are within the scope of the appended claims or the equivalents thereof.

What is claimed is:

1. A biometrics authentication system comprising:
   a light source applying light to a living body;
   a detection section on which the living body is to be placed;
   a microlens array section including a microlens array panel having a first flat panel surface and an opposite second flat panel surface and a plurality of dome-shaped microlenses, the plurality of dome-shaped microlenses including a first set of dome-shaped microlenses integrally connected to and projecting away from the first flat panel surface and a second set of dome-shaped microlenses integrally connected to and projecting away from the second flat panel surface, the plurality of dome-shaped microlenses being arranged on the microlens array panel in a manner that respective individual ones of the first set of dome-shaped microlenses and respective individual ones of the second set of dome-shaped microlenses are positioned as mirrored opposites of one another, the microlens array section configured so that each one of the plurality of dome-shaped microlenses condenses light from the living body;
   a first light shielding panel and a second light shielding panel, each one of the first and second light shielding panels having plurality of apertures formed therethrough, respective ones of the plurality of apertures of the first light shielding panel facing respective ones of first set of dome-shaped microlenses and respective ones of the plurality of apertures of the second light shielding panel facing respective ones of the second set of dome-shaped microlenses;
   an image pickup device obtaining image pickup data of the living body on the basis of the light condensed by the microlens array section; and
   an authentication section performing authentication of the living body on the basis of the image pickup data obtained in the image pickup device,
   wherein the first light shielding panel is arranged on and in facial contact with the first flat panel surface with the plurality of apertures of the first light shielding panel receiving the first set of dome-shaped microlenses and the second light shielding panel is arranged on and in facial contact with the second flat panel surface with the plurality of apertures of the second light shielding panel receiving the second set of dome-shaped microlenses.

2. The biometrics authentication system according to claim 1, wherein
   the first light shielding panel is arranged on a light incidence side of the microlens array section and the second light shielding panel is arranged on a light exiting side of the microlens array section.

3. The biometrics authentication system according to claim 1, wherein
   the light source is arranged, with respect to the detection section, on the same side as a side where the image pickup device is arranged.

4. The biometrics authentication system according to claim 3, wherein
   each one of the first and second light shielding panels has an aperture ratio distribution in which the aperture ratio is higher in a region far from the light source than in a region near the light source.

5. The biometrics authentication system according to claim 1, wherein
   the image pickup device obtains image pickup data of veins of the living body.

* * * * *